United States Patent
Mayuzumi et al.

(10) Patent No.: US 12,529,790 B2
(45) Date of Patent: Jan. 20, 2026

(54) ARRAY-TYPE SCANNING ACOUSTIC TOMOGRAPH AND ULTRASONIC IMAGE DISPLAY METHOD

(71) Applicant: Hitachi Power Solutions Co., Ltd., Hitachi (JP)

(72) Inventors: Takaaki Mayuzumi, Ibaraki (JP); Kaoru Kitami, Ibaraki (JP); Hiroyuki Gunji, Ibaraki (JP)

(73) Assignee: Hitachi Power Solutions Co., Ltd., Hitachi (JP)

( * ) Notice: Subject to any disclaimer, the term of this patent is extended or adjusted under 35 U.S.C. 154(b) by 371 days.

(21) Appl. No.: 17/993,267

(22) Filed: Nov. 23, 2022

(65) Prior Publication Data

US 2023/0168373 A1    Jun. 1, 2023

(30) Foreign Application Priority Data

Nov. 30, 2021    (JP) .................................. 2021-193923

(51) Int. Cl.
*G01S 15/89*    (2006.01)
*G01S 7/52*    (2006.01)

(52) U.S. Cl.
CPC ...... *G01S 15/8993* (2013.01); *G01S 7/52053* (2013.01); *G01S 15/8936* (2013.01)

(58) Field of Classification Search
CPC ............ G01H 3/00; G01H 3/125; G01S 7/56; G01S 15/89; G01S 17/89; G01S 17/894; G03B 42/06
USPC ........................................................... 367/7
See application file for complete search history.

(56) References Cited

U.S. PATENT DOCUMENTS

| | | | | |
|---|---|---|---|---|
| 3,881,466 A | * | 5/1975 | Wilcox | G01H 3/125 73/626 |
| 4,281,550 A | * | 8/1981 | Erikson | G01N 29/262 600/447 |
| 4,862,383 A | * | 8/1989 | Koshimizu | G01N 29/11 73/632 |
| 5,329,930 A | * | 7/1994 | Thomas, III | G01S 15/8918 600/443 |

(Continued)

FOREIGN PATENT DOCUMENTS

JP        2896385 B2  *  5/1999  ....... G01N 2291/044
JP     2001153847 A   *  6/2001  ....... G01N 2291/044

*Primary Examiner* — Daniel L Murphy
*Assistant Examiner* — Amie M Ndure
(74) *Attorney, Agent, or Firm* — Crowell & Moring LLP

(57) ABSTRACT

The array-type scanning acoustic tomograph includes a selection unit to select the elements constituting a vibrator group that connects vibrator drive signals and reception signals. The vibrator group is divided into a first group that emits ultrasonic beams to a former half of an ultrasonic beam irradiation region and a second group that emits ultrasonic beams to a latter half of the ultrasonic beam irradiation region. The selection unit is instructed to select the vibrator groups of the first group to emit ultrasonic beams, instructed to select the vibrator group of the second group to emit ultrasonic beams, then the selection unit is instructed to select the vibrator groups of the first group to receive reflected ultrasonic waves, and then instructed to select the vibrator group of the second group to receive reflected ultrasonic wave, and the same waveforms are displayed on a display unit without overlapping.

9 Claims, 6 Drawing Sheets

(56) References Cited

U.S. PATENT DOCUMENTS

| | | | | |
|---|---|---|---|---|
| 6,782,752 | B2* | 8/2004 | Basir | G01N 29/11 |
| | | | | 73/625 |
| 9,395,336 | B2* | 7/2016 | Tomita | G01N 29/265 |
| 10,373,889 | B2* | 8/2019 | Ooshima | H01L 25/112 |
| 2003/0140683 | A1* | 7/2003 | Basir | G01N 29/28 |
| | | | | 73/54.41 |
| 2004/0012834 | A1* | 1/2004 | Schwarte | G02F 2/002 |
| | | | | 359/237 |
| 2004/0244489 | A1* | 12/2004 | Basir | G01N 29/11 |
| | | | | 73/579 |
| 2006/0123911 | A1* | 6/2006 | Basir | G01N 29/024 |
| | | | | 73/54.41 |
| 2009/0088642 | A1* | 4/2009 | Sato | A61B 8/54 |
| | | | | 600/459 |
| 2010/0022883 | A1* | 1/2010 | Satoh | A61B 8/14 |
| | | | | 600/447 |
| 2014/0024941 | A1* | 1/2014 | Umeda | A61B 8/54 |
| | | | | 600/445 |
| 2014/0318252 | A1* | 10/2014 | Tomita | G01N 29/265 |
| | | | | 73/625 |
| 2014/0350439 | A1* | 11/2014 | Zur | G01R 33/385 |
| | | | | 601/3 |
| 2018/0008233 | A1* | 1/2018 | Pelissier | A61B 8/4488 |
| 2019/0057921 | A1* | 2/2019 | Ooshima | H01L 23/3142 |
| 2020/0000431 | A1* | 1/2020 | Murai | G01B 17/00 |
| 2020/0355575 | A1* | 11/2020 | Chapuis | G01N 29/2475 |
| 2022/0146669 | A1* | 5/2022 | Simpson | G01S 7/52047 |

* cited by examiner

[FIG. 1]
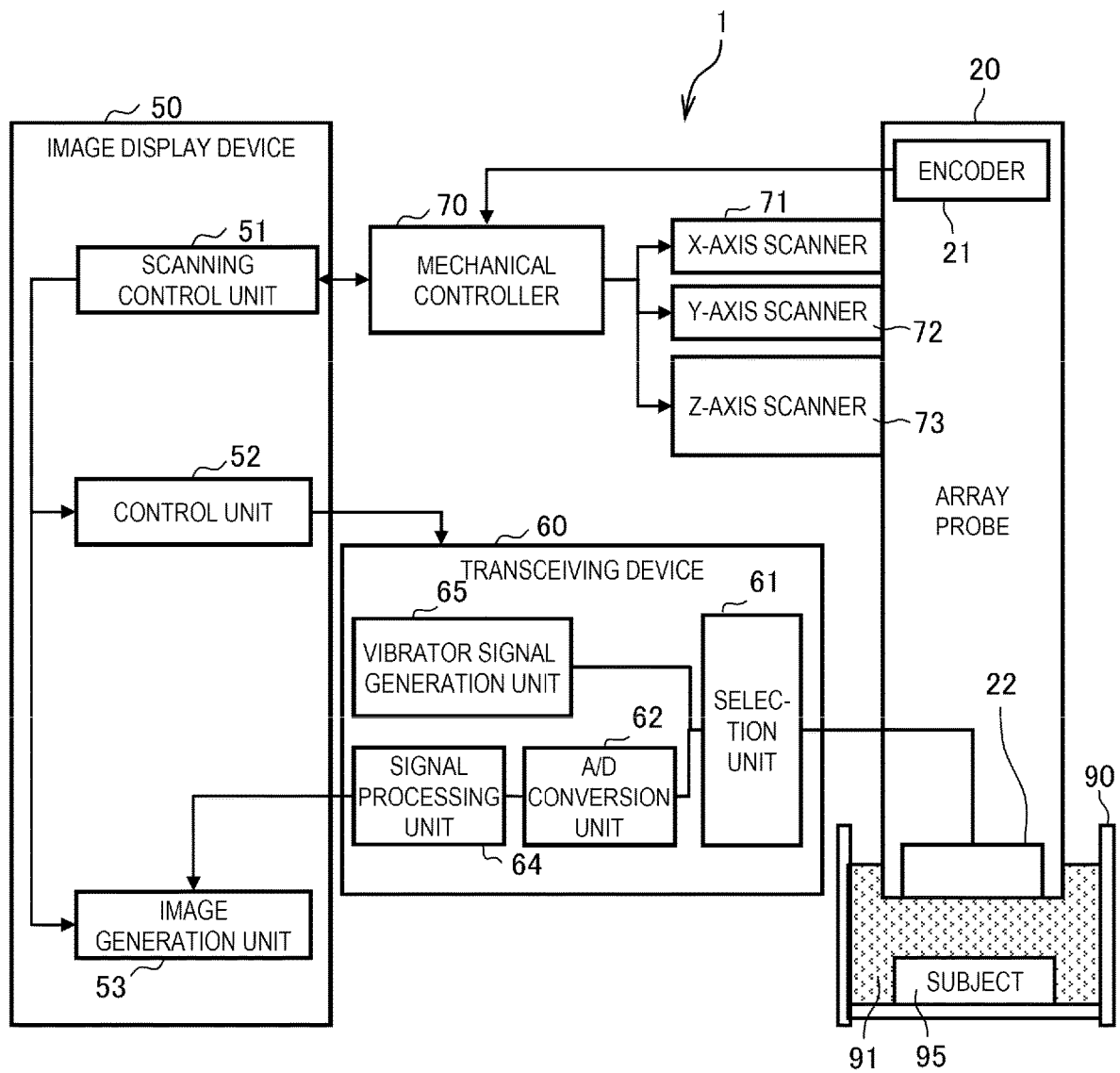

[FIG. 2]
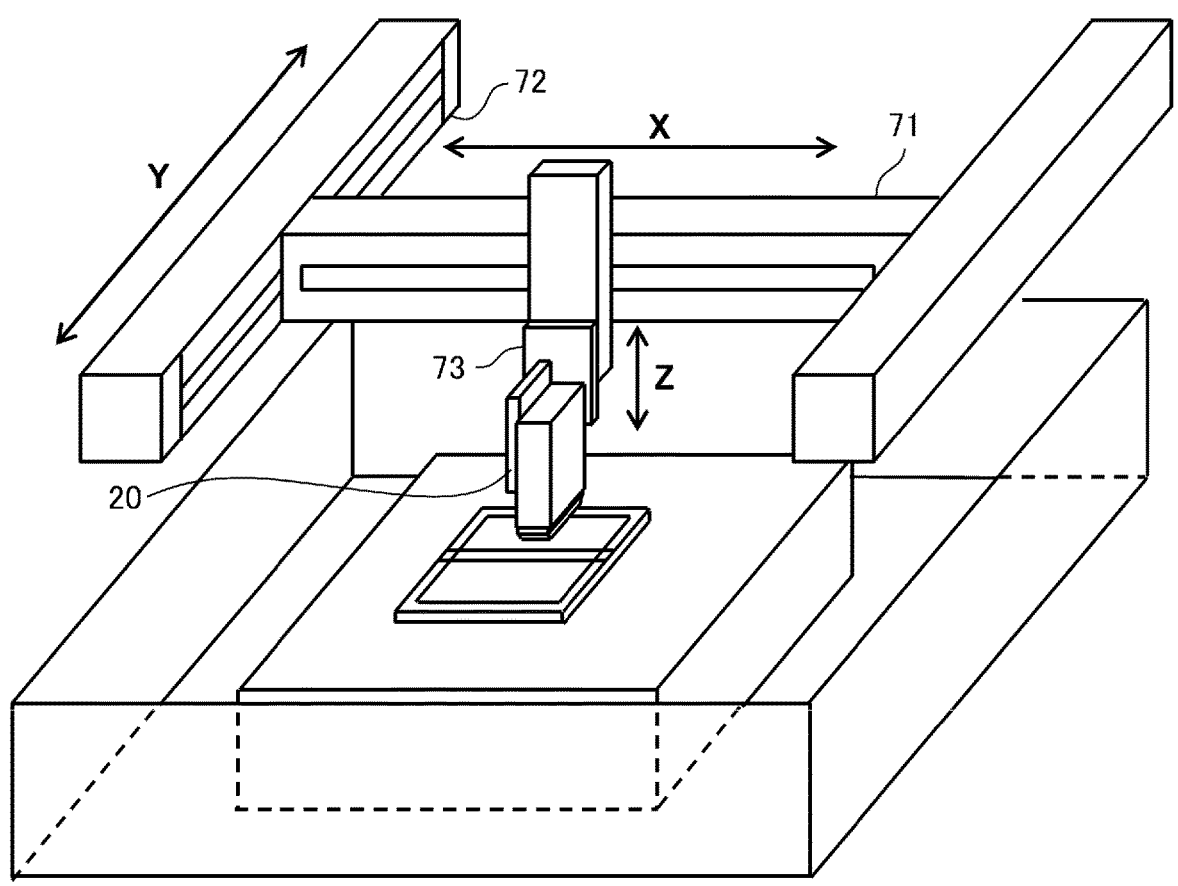

[FIG. 3]
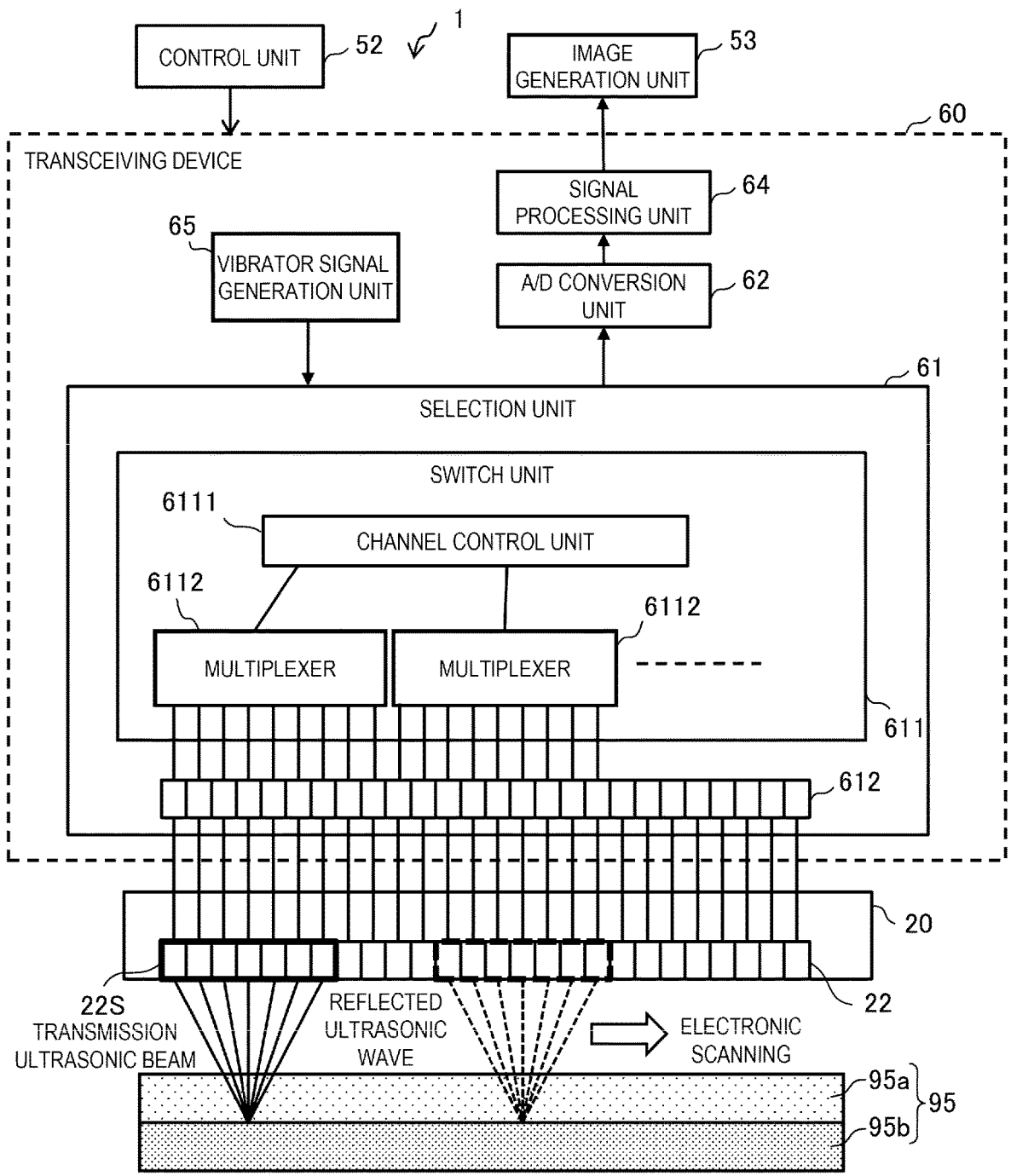

[FIG. 4A]
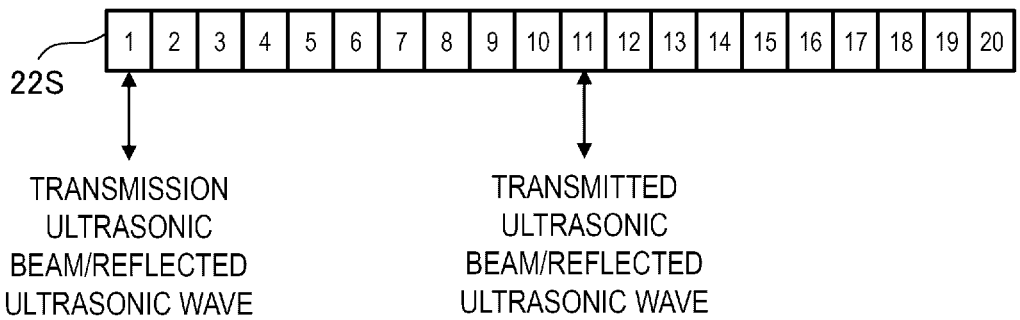
[FIG. 4B]
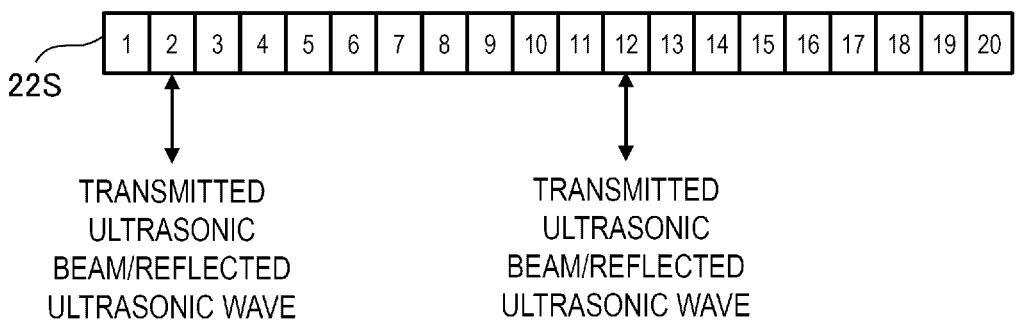
[FIG. 4C]
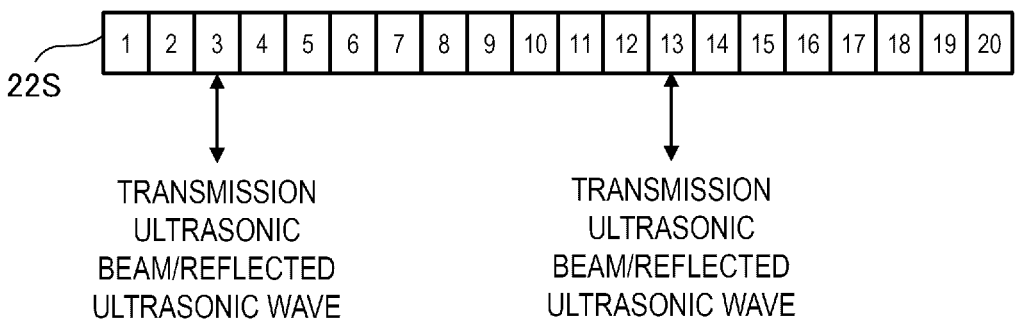

[FIG. 5]
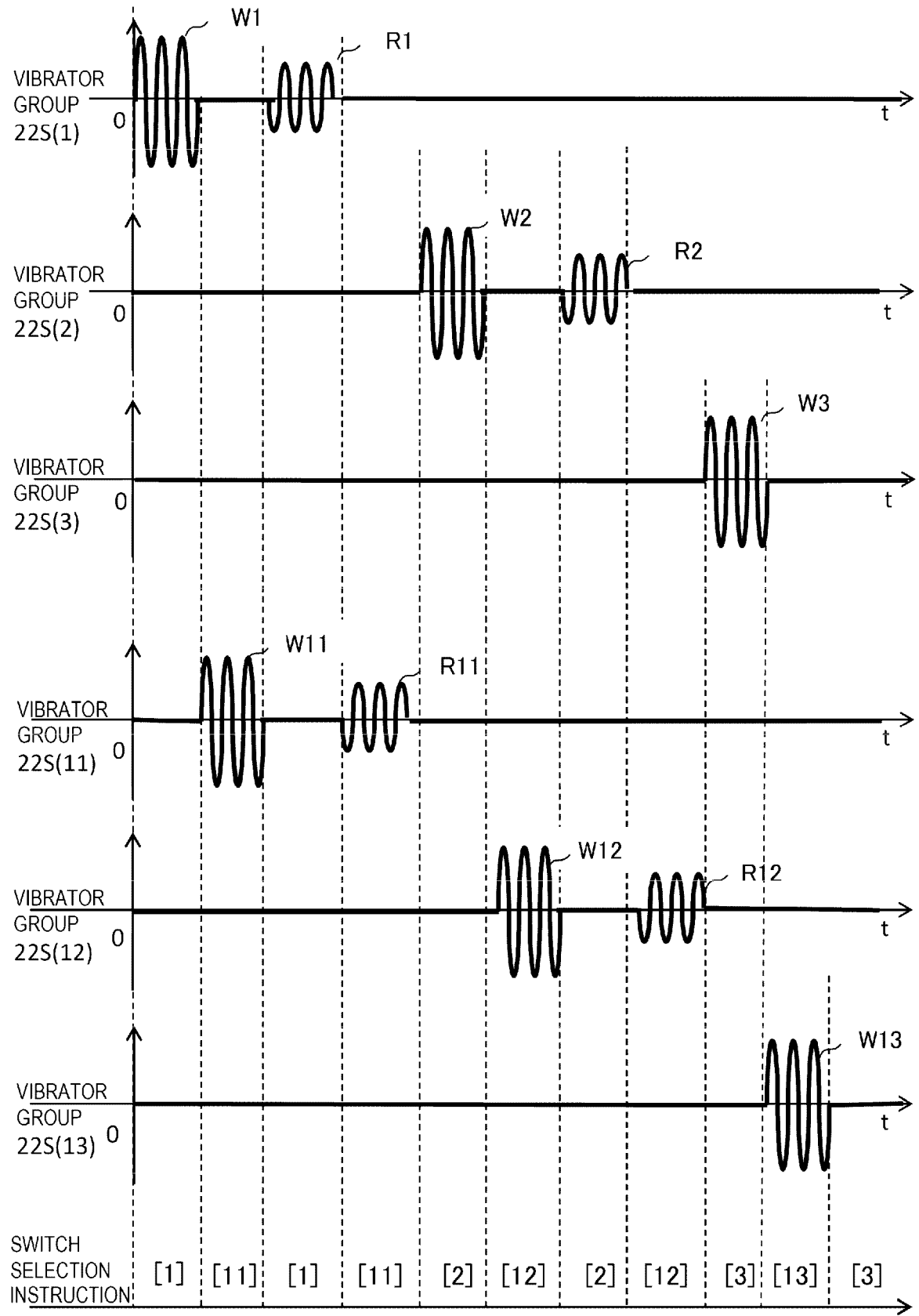

[FIG. 6]
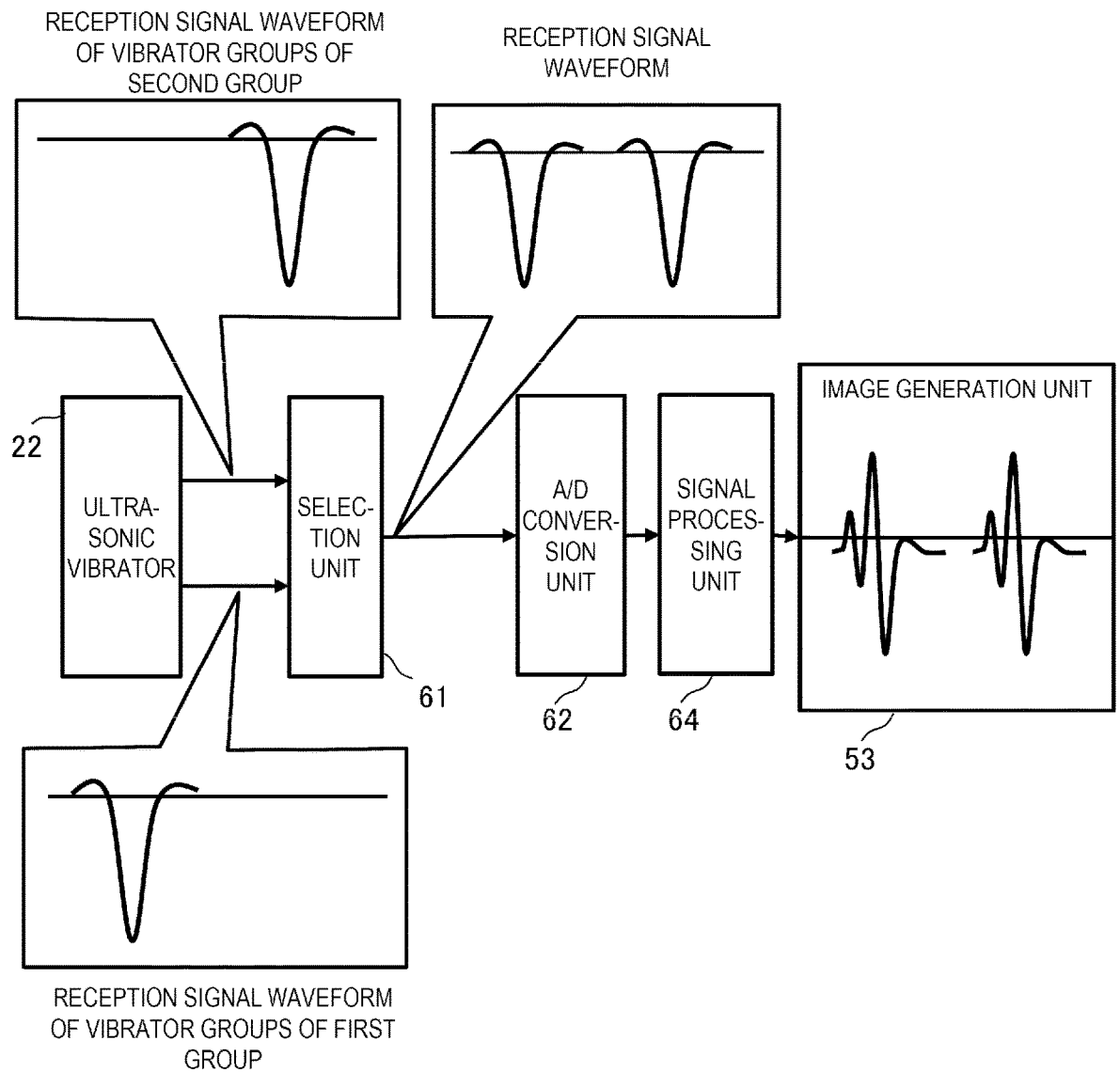

ARRAY-TYPE SCANNING ACOUSTIC TOMOGRAPH AND ULTRASONIC IMAGE DISPLAY METHOD

TECHNICAL FIELD

The present invention relates to an array-type scanning acoustic tomograph.

BACKGROUND ART

Recently, with an increase in an integration degree of semiconductors (subjects), shortening time for detecting separation in an interface inside the subject, that is, high-speed flaw detection is required. As one of such methods, a flaw detection method using an array-type scanning acoustic tomograph that electronically switches operations of a plurality of ultrasonic vibrators is known. However, in order to cope with higher integration of semiconductors which are subjects, higher-speed flaw detection is required.

PTL 1 describes an invention that reduces scatter noises and improves a signal-to-noise (SN) ratio by arranging a plurality of ultrasonic vibrators linearly, selecting a predetermined number of element sequences from among the ultrasonic vibrators, applying a phase-adjusted voltage pulse to each of the elements to generate a focused ultrasonic beam, and sequentially switching the selection and performing moving average processing on echoes obtained by ultrasonic beam scanning.

CITATION LIST

Patent Literature

PTL 1: JP-A-2001-153847

SUMMARY OF INVENTION

Technical Problem

PTL 1 discloses that inspection can be performed in a shorter time than time needed when a single vibrator is used, but there is neither a further description nor a description about high-speed flaw detection.

A method for displaying an ultrasonic image of a subject in a short time by an array-type scanning acoustic tomograph achieves shortening of electronic scanning time, shortening of processing time of ultrasonic receiving signals, and the like. With the development of integrated-circuit technology in recent years, it becomes possible to speed up the processing time. On the other hand, electronic scanning requires time to transmit and receive ultrasonic waves and has physical limits.

An object of the invention is to provide an ultrasonic image display device that speeds up a display of ultrasonic images of reflected waves from a subject.

Solution to Problem

In order to solve the above problem, the invention provides an array-type scanning acoustic tomograph for sequentially selecting a vibrator group including a predetermined number of continuous elements of an ultrasonic vibrator including a plurality of elements continuously arranged in an array, emitting ultrasonic beams, and receiving, by the vibrator group, reflected ultrasonic waves from a subject. The array-type scanning acoustic tomograph includes: a signal processing unit to process reception signals of the reflected ultrasonic waves received by the vibrator group; a selection unit to select the elements constituting the vibrator group that connects vibrator drive signals and the reception signals; a control unit to divide the vibrator group into a first group that emits ultrasonic beams to a former half of an ultrasonic beam irradiation region and a second group that emits ultrasonic beams to a latter half of the ultrasonic beam irradiation region, instruct the selection unit to select elements corresponding to the vibrator group of the first group to emit the ultrasonic beams, instruct the selection unit to select elements corresponding to the vibrator group of the second group to emit the ultrasonic beams, then instruct the selection unit to select the elements corresponding to the vibrator group of the first group to receive the reflected ultrasonic wave, and then instruct the selection unit to select the elements corresponding to the vibrator group of the second group to receive the reflected ultrasonic wave; and an image generation unit to display, on a display unit without overlapping the same waveform, a processing result of the reception signals obtained by the signal processing unit.

Advantageous Effects of Invention

According to the array-type scanning acoustic tomograph of the invention, since the vibrator groups of the first group emitting the ultrasonic beams to the former half of the ultrasonic beam irradiation region and the vibrator groups of the second group emitting the ultrasonic beams to the latter half of the ultrasonic beam irradiation region perform scanning with the ultrasonic beams in parallel in a predetermined order, it is possible to easily speed up the display of the ultrasonic images of the reflected waves from the subject.

BRIEF DESCRIPTION OF DRAWINGS

FIG. 1 is a configuration diagram of an array-type scanning acoustic tomograph according to an embodiment.

FIG. 2 is a perspective view of the array-type scanning acoustic tomograph according to the embodiment.

FIG. 3 is a functional block diagram illustrating details of a selection unit of the array-type scanning acoustic tomograph.

FIG. 4A is a diagram illustrating emission positions of transmission ultrasonic beams of a vibrator group 22S.

FIG. 4B is a diagram illustrating other emission positions of transmission ultrasonic beams of the vibrator group 22S.

FIG. 4C is a diagram illustrating still other emission positions of transmission ultrasonic beams of the vibrator group 22S.

FIG. 5 is a diagram illustrating timings of emission of the transmission ultrasonic beams and reception of reflected ultrasonic waves, and selection states of switches.

FIG. 6 is a diagram illustrating processing of reception signals of the reflected ultrasonic waves.

DESCRIPTION OF EMBODIMENTS

Hereinafter, embodiments of the invention will be described in detail with reference to the drawings.

FIG. 1 is a configuration diagram of an array-type scanning acoustic tomograph 1 according to an embodiment.

The array-type scanning acoustic tomograph 1 includes an array probe 20 that performs transmission and reception of ultrasonic waves, an image display device 50 that integrally controls the array-type scanning acoustic tomograph 1 and displays an ultrasonic image, and a transceiving device 60 that inputs and outputs an electric signal to and from the array probe 20. The array-type scanning acoustic tomograph 1 further includes an X-axis scanner 71 and a Y-axis scanner 72 that performs mechanically scanning using the array probe 20, a Z-axis scanner 73 that adjusts the array probe 20 in a height direction or performs scanning, and a mechanical controller 70 that controls the X-axis scanner 71, the Y-axis scanner 72, and the Z-axis scanner 73.

The array probe 20 is supported by the X-axis scanner 71, the Y-axis scanner 72, and the Z-axis scanner 73, and immerged in water 91 with which a water tank 90 is filled to allow an ultrasonic vibrator 22 to face a subject 95. Accordingly, the array probe 20 captures an ultrasonic image such as an interface formed between layers of constituent members of the subject 95.

The array probe 20 includes an encoder 21 that detects a scanning position of the array probe 20 and the ultrasonic vibrator 22 that converts the electric signals into ultrasonic wave signals, and vice versa. The ultrasonic vibrator 22 is a phased array ultrasonic vibrator in which a plurality of elements are continuously arranged in an array, emits transmission ultrasonic waves (ultrasonic beams) to the subject 95 and receives reflected ultrasonic waves which are reflected from the subject 95.

The image display device 50 includes a scanning control unit 51 that controls the scanning position of the array probe 20, a control unit 52 that controls the transmission and reception timing of the ultrasonic waves, and an image generation unit 53 that generates an ultrasonic image.

The transceiving device 60 includes a selection unit 61, an A/D conversion unit 62, a signal processing unit 64, and a vibrator signal generation unit 65.

The selection unit 61 selects a vibrator group 22S that includes a predetermined number of continuous elements among the plurality of elements of the ultrasonic vibrator 22 and emits transmission ultrasonic beams.

The selected vibrator group 22S is supplied with vibrator drive signals which are generated by the vibrator signal generation unit 65 for each element and have different phases, and emits focused ultrasonic beams.

The transmission ultrasonic beams emitted from the selected vibrator group 22S are reflected at an interface to be flaw-detected of the subject 95 to become reflected ultrasonic waves, and the reflected ultrasonic waves are received by the selected vibrator group 22S and converted into reception signals.

The A/D conversion unit 62 digitally converts the reception signals converted by the vibrator group 22S while performing delay compensation and synthesis based on distance differences between elements.

In the signal processing unit 64, the digital reception signals converted by the A/D conversion unit 62 are subjected to signal processing and output into the image generation unit 53. That is, the signal processing unit 64 performs the signal processing on the reflected ultrasonic waves which are reflected from the interface to be flaw-detected of the subject 95 and received by the vibrator group 22S.

The scanning control unit 51 is connected to the mechanical controller 70 (scanner) to enable the input and output between the scanning control unit 51 and the mechanical controller 70. The scanning control unit 51 controls a scanning position of the array probe 20 with the mechanical controller 70, the X-axis scanner 71, the Y-axis scanner 72, and the Z-axis scanner 73, and receives current scanning position information of the array probe 20 from the mechanical controller 70.

An output side of the mechanical controller 70 is connected to the X-axis scanner 71, the Y-axis scanner 72, and the Z-axis scanner 73. An output side of the encoder 21 of the array probe 20 is connected to the mechanical controller 70. The mechanical controller 70 detects the scanning position of the array probe 20 based on an output signal of the encoder 21 and controls the array probe 20 to locate at an instructed scanning position by the X-axis scanner 71, the Y-axis scanner 72, and the Z-axis scanner 73. The mechanical controller 70 receives a control instruction for the array probe 20 from the scanning control unit 51, and in response to this reception, transmits a scanning position information of the array probe 20.

The control unit 52 outputs an operation command signal to the transceiving device 60 based on the scanning position information of the array probe 20 obtained from the scanning control unit 51. The operation command signal is output to the selection unit 61 and the vibrator signal generation unit. The control unit 52 controls the selection of the vibrator group 22S, the emission of the transmission ultrasonic waves (ultrasonic beams) from the vibrator group 22S, and the reception of the reflected ultrasonic waves based on the operation command signal.

Each of the elements constituting the ultrasonic vibrator 22 includes electrodes that are attached to both sides of a piezoelectric film, and is made of ZnO, ceramics, a fluorine system copolymer, or the like. Each of the elements constituting the ultrasonic vibrator 22 emits transmission ultrasonic waves from the piezoelectric film by being applied a voltage between both electrodes. Further, each of the elements constituting the ultrasonic vibrator 22 converts echo waves (reflected ultrasonic waves) received by the piezoelectric film into reception signals which are voltages generated between both the electrodes.

The selection unit 61 relays the reception signals of the reflected ultrasonic waves received by the elements of the ultrasonic vibrator 22 to the A/D conversion unit 62.

The A/D conversion unit 62 digitally converts analog reception signals.

The signal processing unit 64 performs signal processing on the reception signals of the ultrasonic vibrator 22 in a predetermined period and outputs amplitude information or time information of the reflected ultrasonic waves to the image generation unit 53.

Specifically, the signal processing unit 64 performs imaging processing on the reception signals, which are obtained by digitally converting the reception signals of the reflected ultrasonic waves of the elements corresponding to the vibrator group 22S by the A/D conversion unit 62, at a gate in which a start timing and an end timing for imaging are set as a time axis which is a horizontal axis, and an allowable maximum amplitude is set as a vertical axis.

The image generation unit 53 generates an ultrasonic image of the subject based on an output signal of the signal processing unit 64.

FIG. 2 is a perspective view of the array-type scanning acoustic tomograph 1.

Here, only the X-axis scanner 71, the Y-axis scanner 72, the Z-axis scanner 73, and the array probe 20 are shown as a part of the array-type scanning acoustic tomograph 1.

The Y-axis scanner 72 causes the X-axis scanner 71 to move in ±Y directions (a depth direction). The X-axis scanner 71 causes the array probe 20 to move in ±X directions (a left-right direction). The Z-axis scanner 73 causes the array probe 20 to move in ±Z directions (the height direction).

The array probe 20 includes the ultrasonic vibrator 22 (FIG. 1) having the plurality of elements arranged in the Y direction at a tip portion of the array probe 20, and the encoder 21 (FIG. 1). The array probe 20 is immersed in the water 91 with which the water tank 90 is filled and disposed above the subject 95 so as to face the subject 95 at a predetermined distance in the Z direction. The distance between the array probe 20 and the subject 95 is adjusted by the Z-axis scanner 73.

The ultrasonic vibrator 22 of the array-type scanning acoustic tomograph 1 performs scanning in the Y direction by driving the vibrator group 22S including a predetermined number of elements among the plurality of elements to sequentially emit the ultrasonic beams. In the present specification, the scanning with the ultrasonic beams of the ultrasonic vibrator 22 is referred to as electronic scanning.

The array-type scanning acoustic tomograph 1 uses the X-axis scanner 71 to move the array probe 20 in the ±X directions (left-right direction) of a scanning surface of the subject 95 and uses the Y-axis scanner 72 to move the array probe 20 (X-axis scanner 71) in the Y direction of the scanning surface of the subject 95 by a scanning width of the electronic scanning at an end of the scanning surface in the ±X directions while performing the electronic scanning with the ultrasonic vibrator 22.

Accordingly, the array-type scanning acoustic tomograph 1 performs two-dimensional scanning on the scanning surface of the subject 95 with the array probe 20 and captures an ultrasonic image of the subject 95.

FIG. 3 is a functional block diagram illustrating details of the selection unit 61 of the array-type scanning acoustic tomograph 1 according to the embodiment illustrated in FIG. 1.

The selection unit 61 includes a switch unit 611 and vibrator drivers 612.

The vibrator drivers 612 are each a combination of an amplifier that amplifies the vibrator drive signals from the switch unit 611 and an amplifier that amplifies the reception signals of the reflected ultrasonic waves received by the ultrasonic vibrator 22, and are connected to the respective elements of the ultrasonic vibrator 22 on a one-to-one basis.

The switch unit 611 includes a channel control unit 6111 and a plurality of multiplexers 6112.

The channel control unit 6111 instructs a vibrator group 22S (channels) that emits the ultrasonic beams and a vibrator group 22S (channels) that receives the reflected ultrasonic waves to the multiplexer 6112.

The multiplexers 6112 connects, based on a channel instruction of the channel control unit 6111, a plurality of vibrator drive signals which are generated by the vibrator signal generation unit 65 and have different phases to the vibrator drivers 612 corresponding to the channels, respectively, and connects, based on a channel instruction, the reception signals of the reflected ultrasonic waves of the vibrator drivers 612 corresponding to the channel to the A/D conversion unit 62. In FIG. 3, a multiplexer for multiple channels is illustrated as one block.

As described above, the selection unit 61 selects, from the plurality of elements of the ultrasonic vibrator 22, a vibrator group 22S that emits ultrasonic beams and a vibrator group 22S that receives the reflected ultrasonic waves.

The details will be described later, the channel control unit 6111 sequentially instructs channels in a predetermined cycle by the processor executing a program so that the electronic scanning is performed in parallel by emitting the transmission ultrasonic beams and receiving the reflected ultrasonic waves in a region including the former half region and the latter half region in the direction (Y direction) in which the elements of the ultrasonic vibrator 22 are arranged.

In FIG. 3, seven elements which are connected to the vibrator signal generation unit 65 by the switch unit 611 and to which phase-controlled vibrator drive signals are input via the vibrator drivers 612 emit ultrasonic waves and generate transmission ultrasonic beams that are focused on a predetermined focal position (a surface of the subject 95 or a distance to an interface between a first layer 95a and a second layer 95b). That is, the seven elements that generate the transmission ultrasonic beams form a vibrator group 22S.

The reflected ultrasonic waves reflected by the surface of the subject 95 or the interface between the first layer 95a and the second layer 95b are received by the respective elements of the vibrator group 22S that emits the transmission ultrasonic beams, and the reception signals of the reflected ultrasonic waves are sent, via the vibrator drivers 612, to the A/D conversion unit 62 connected by the switch unit 611.

In other words, the selection unit 61 selects, from the plurality of elements of the ultrasonic vibrator 22, the vibrator group 22S that includes the predetermined number of continuous elements (seven continuous elements in the present embodiment) and emits transmission ultrasonic beams. The transmission ultrasonic beams emitted from the selected vibrator group 22S are reflected at the interface to be flaw-detected of the subject 95 to become the reflected ultrasonic waves, and the reflected ultrasonic waves are received by the selected vibrator group 22S and converted into reception signals.

Then, the selection unit 61 sends reception signals of the selected vibrator group 22S to the A/D conversion unit 62.

Specifically, the selection unit 61 selects a vibrator group 22S(1) by connecting elements (1) to (7) of the ultrasonic vibrator 22 and selects a vibrator group 22S(2) by connecting elements (2) to (8) of the ultrasonic vibrator 22 based on the channel instructions of the switch unit 611.

The transceiving device 60 (control unit 52) controls phases of the vibrator drive signals of the vibrator signal generation unit 65, controls an operation of each of the vibrator drivers 612, and controls the channel selection of the switch unit 611 based on operation signal commands from the control unit 52. Accordingly, the control unit 52 sequentially selects, from the elements of the ultrasonic vibrator 22, vibrator groups 22S different from each other in positions of the elements therein, and controls the emission of the transmission ultrasonic beams and the reception of the reflected ultrasonic waves to perform the electronic scanning with the ultrasonic vibrator 22.

In FIG. 3, although an example that the vibrator group 22S includes seven elements has been described, it is needless to say that the invention is not limited to this example.

Next, an irradiation position of the transmission ultrasonic beams of the vibrator group 22S in the electronic scanning with the array-type scanning acoustic tomograph 1 according to the embodiment will be described with reference to FIGS. 4A to 4C.

In the array-type scanning acoustic tomograph 1 according to the embodiment, the electronic scanning is performed in parallel by emitting the transmission ultrasonic beams and receiving the reflected ultrasonic waves in the region including the former half region and the latter half region, which is a region to be electronically scanned, in the direction (Y direction) in which the elements of the ultrasonic vibrator 22 are arranged.

The array-type scanning acoustic tomograph 1 according to the embodiment performs one emission of the transmission ultrasonic beams by using one vibrator group 22S. In the following description, the irradiation position of the transmission ultrasonic beams will be described as a position of the vibrator group 22S.

In FIGS. 4A to 4C, the ultrasonic vibrator 22 includes 26 elements from which seven continuous elements constitute a vibrator group 22S is described as an example. Therefore, emission of the transmission ultrasonic beams of the vibrator groups 22S(1) to 22S(10) corresponds to the former half region of the electronic scanning, and emission of the transmission ultrasonic beams of the vibrator groups 22S(11) to 22S(20) corresponds to the latter half region of the electronic scanning.

As described above, the number of elements is 26 (elements (1) to (26)), and the number of vibrator groups is 20 (vibrator groups 22S(1) to 22S(20)). That is, the vibrator group 22S(1) includes the 1st to 7th elements counted from a side (left side), the vibrator group 22S(2) includes the 2nd to 8th elements, a vibrator group 22S(3) includes the 3rd to 9th elements . . . , a vibrator group 22S(19) includes the 19th to 25th elements, and finally, the vibrator group 22S(20) includes the 20th to 26th elements. The vibrator groups in the former half region are vibrator groups 22S(1) to 22S(10), and the elements corresponding to the former half region are the 1st to 16th elements counted from the left side (elements (1) to (16)). The vibrator groups in the latter half region are vibrator groups 22S(11) to 22S(20), and the elements corresponding to the latter half region are the 11th to 26th elements counted from the left side (elements (11) to (26)).

As shown in FIG. 4A, the transceiving device 60 (control unit 52) selects the vibrator group 22S(1) by the selection unit 61 to emit transmission ultrasonic beams. Then, the transceiving device 60 selects at least the vibrator group 22S(11) next to emit the transmission ultrasonic beams, and the vibrator group 22S(11) is located at a position apart from the vibrator group 22S(1) by a distance at which the emitted transmission ultrasonic beams and the reflected ultrasonic waves of the vibrator group 22S(1) do not interfere with those of the vibrator group 22S(11). An emission timing of the transmission ultrasonic beams of each of the vibrator group 22S(1) and the vibrator group 22S(11) will be described later with reference to FIG. 5.

The transceiving device 60 selects the vibrator group 22S(1) to receive the reflected ultrasonic waves and sends the reception signals to the A/D conversion unit 62. Then, the control unit 52 selects the vibrator group 22S(11) to receive the reflected ultrasonic waves, sends the reception signals to the A/D conversion unit 62, and performs the emission of the transmission ultrasonic beams shown in FIG. 4B.

In FIG. 4B, the transceiving device 60 selects the vibrator group 22S(2) by the selection unit 61 to emit transmission ultrasonic beams. Then, the transceiving device 60 selects at least the vibrator group 22S(12) next to emit the transmission ultrasonic beams, and the vibrator group 22S(12) is located at a position apart from the vibrator group 22S(2) by a distance at which the emitted transmission ultrasonic beams and the reflected ultrasonic waves of the vibrator group 22S(2) do not interfere with those of the vibrator group 22S(12).

The transceiving device 60 selects the vibrator group 22S(2) to receive the reflected ultrasonic waves and sends the reception signals to the A/D conversion unit 62. Then, the control unit 52 selects the vibrator group 22S(12) to receive the reflected ultrasonic waves, sends the reception signals to the A/D conversion unit 62, and performs the emission of the transmission ultrasonic beams shown in FIG. 4C.

In FIG. 4C, the transceiving device 60 selects the vibrator group 22S(3) by the selection unit 61 to emit transmission ultrasonic beams. Then, the transceiving device 60 selects at least the vibrator group 22S(13) next to emit the transmission ultrasonic beams, and the vibrator group 22S(13) is located at a position apart from the vibrator group 22S(3) by a distance at which the emitted transmission ultrasonic beams and the reflected ultrasonic waves of the vibrator group 22S(3) do not interfere with those of the vibrator group 22S(13).

The transceiving device 60 selects the vibrator group 22S(3) to receive the reflected ultrasonic waves and sends the reception signals to the A/D conversion unit 62. The control unit 52 selects the vibrator group 22S(13) to receive the reflected ultrasonic waves and sends the reception signals to the A/D conversion unit 62.

The transceiving device 60 similarly controls the emission of transmission ultrasonic beams and the reception of the reflected ultrasonic waves of the vibrator groups 22S(4) to 22S(10) and the vibrator groups 22S(14) to 22S(20). Accordingly, the array-type scanning acoustic tomograph 1 according to the embodiment performs the electronic scanning in parallel by emitting the transmission ultrasonic beams and receiving the reflected ultrasonic waves in the region including the former half region and the latter half region which is a region to be electronically scanned.

Next, the timing of the emission of the transmission ultrasonic beams and the reception of the reflected ultrasonic waves of the vibrator group 22S and the selection state of the switch of the selection unit 61 will be described with reference to FIG. 5.

FIG. 5 is a diagram showing temporal changes in input and output waveforms of the vibrator groups 22S(1), 22S(2), 22S(3), 22S(11), 22S(12), and 22S(13) shown in FIGS. 4A to 4C, and the selection state of the switch unit 611.

First, in order for the vibrator group 22S(1) in FIG. 4A to emit transmission ultrasonic beams W1, the transceiving device 60 (control unit 52) sets the switch unit 611 such that the channel control unit 6111 selects the vibrator group 22S(1). [n] of switch selection instructions in FIG. 5 indicates a selection of the vibrator group 22S(n). Then, the vibrator group 22S(1) emits the transmission ultrasonic beams W1.

When the emission of the transmission ultrasonic beams W1 is completed, the transceiving device 60 (control unit 52) sets the switch unit 611 to select the vibrator group 22S(11) in FIG. 4A, and the vibrator group 22S(11) emits transmission ultrasonic beams W11. Here, the position of the vibrator group 22S(11) is a position at which the transmission ultrasonic beams W11 of the vibrator group 22S(11) do not interfere with the transmission ultrasonic beams W1 of the vibrator group 22S(1). The same also applies to the subsequent transmission ultrasonic beams W12, W13 . . . .

Since the transmission ultrasonic beams W1 and the transmission ultrasonic beams W11 do not interfere with each other, they can be emitted at the same time, and when the transmission ultrasonic beams are emitted at the same time, since the reflected ultrasonic waves are received at the same time, it is necessary to provide a selection circuit of the reception signal and the A/D conversion units 62 and the signal processing units 64 of two systems.

Thus, in the array-type scanning acoustic tomograph 1 according to the embodiment, the transceiving device 60 sequentially emits the transmission ultrasonic beams W1 and the transmission ultrasonic beams W11 and sequentially processes the reflected ultrasonic waves. This eliminates the need to add the A/D conversion unit 62 and the signal processing unit 64.

When the emission of the transmission ultrasonic beams W11 is completed, the transceiving device 60 sets the switch unit 611 to select the vibrator group 22S(1) and receives reflected ultrasonic waves R1. Then, the received reception signals are sent to the A/D conversion unit 62.

When the reception of the reflected ultrasonic waves R1 is completed, the transceiving device 60 sets the switch unit 611 to select the vibrator group 22S(11) and receives reflected ultrasonic waves R11. Then, the received reception signals are sent to the A/D conversion unit 62.

Compared to the case of sequentially performing the transmission and reception of the ultrasonic waves of the vibrator group 22S(11) after the transmission and reception of the ultrasonic waves of the transducer group 22S(1), the reception signals can be acquired in a short time by, as shown in FIG. 5, sequentially emitting the transmission ultrasonic beams W1 and the transmission ultrasonic beams W11 from the vibrator groups 22S(1) and the vibrator groups 22S(11) which are in a positional relation in which the ultrasonic waves of the vibrator groups 22S(1) do not interfere with those of the vibrator groups 22S(11), as shown in FIG. 4A.

Specifically, after completing the emission of the transmission ultrasonic beams W1, the transceiving device 60 performs the emission of the transmission ultrasonic beams W11 within a range in which the emission of the transmission ultrasonic beams W11 ends before the reception of the reflected ultrasonic waves R1. More specifically, the emission of the transmission ultrasonic beams W11 is performed within a time range that includes a switching time of the switch unit 611.

When the reception of the reflected ultrasonic waves R11 is completed, the transceiving device 60 sets the switch unit 611 such that the channel control unit 6111 selects the vibrator group 22S(2) as shown in FIG. 4B in order for the vibrator group 22S(2) to emit the transmission ultrasonic beams W2. Then, the vibrator group 22S(2) emits the transmission ultrasonic beams W2.

In this case, in order to perform the electronic scanning at a constant timing, the timing is adjusted such that emission intervals of the transmission ultrasonic beams W1, W2, W3 . . . become constant. Accordingly, variations in the irradiation positions of the ultrasonic beams are prevented, and a positional accuracy of the reflected ultrasonic waves is maintained.

By the way, it has been explained that the position of the vibrator group 22S(11) is a position at which the transmission ultrasonic beams W11 of the vibrator group 22S(11) do not interfere with the transmission ultrasonic beams W1 emitted by the vibrator group 22S(1), but since the emission of the transmission ultrasonic beams W2 is after the reception of the reflected ultrasonic waves R11, the position of the vibrator group 22S(2) with respect to the vibrator group 22S(11) is not necessary to consider an ultrasonic interference. The same also applies to the emissions of the subsequent transmission ultrasonic beams W3 . . . .

When the emission of transmission ultrasonic beams W2 is completed, the transceiving device 60 (control unit 52) sets the switch unit 611 to select the vibrator group 22S(12) in FIG. 4B, and the vibrator group 22S(12) emits transmission ultrasonic beams W12.

When the emission of the transmission ultrasonic beams W12 is completed, the transceiving device 60 sets the switch unit 611 to select the vibrator group 22S(2) and receives reflected ultrasonic waves R2. Then, the received reception signals are sent to the A/D conversion unit 62.

When the reception of the reflected ultrasonic waves R2 is completed, the transceiving device 60 sets the switch unit 611 to select the vibrator group 22S(12) and receives reflected ultrasonic waves R12. The received reception signals are sent to the A/D conversion unit 62.

When the reception of the reflected ultrasonic waves R12 is completed, the transceiving device 60 sets the switch unit 611 such that the channel control unit 6111 selects the vibrator group 22S(3) as shown in FIG. 4C in order for the vibrator group 22S(3) to emit the transmission ultrasonic beams W3. Then, the vibrator group 22S(3) emits transmission ultrasonic beams W3.

When the emission of the transmission ultrasonic beams W3 is completed, the transceiving device 60 (control unit 52) sets the switch unit 611 to select the vibrator group 22S(13) in FIG. 4C, and the vibrator group 22S(13) emits transmission ultrasonic beams W13.

The subsequent receptions of reflected ultrasonic waves R3 and R13 are also performed in the same manner as described above. Further, the electronic scanning is performed by repeating the emission of the transmission ultrasonic beams and the reception of reflected ultrasonic waves in an order of the vibrator group 22S(4), 22S(14), 22S(5), 22S(15), 22S(6) . . . .

Accordingly, the array-type scanning acoustic tomograph 1 according to the embodiment performs the electronic scanning in parallel by emitting the transmission ultrasonic beams and receiving the reflected ultrasonic waves in the region including the former half region and the latter half region, which is a region to be electronically scanned, in the direction (Y direction) in which the elements of the ultrasonic vibrator 22 are arranged.

Processing of the reception signals of the reflected ultrasonic waves will be described with reference to FIG. 6.

FIG. 6 is a diagram showing a flow of the reception signals in the ultrasonic vibrator 22, the selection unit 61, the A/D conversion unit 62, the signal processing unit 64, and the image generation unit 53.

In the region including the former half region and the latter half region in the direction (Y direction) in which the elements of the ultrasonic vibrator 22 are arranged, the vibrator groups of the first group 22S (22S(1), 22S(2), 22S(3) . . . ) that emit transmission ultrasonic beams to the former half region and the vibrator groups of the second group 22S (22S(11), 22S(12), 22S(13) . . . ) that emit transmission ultrasonic beams to the latter half region emit the transmission ultrasonic beams and receive the reflected ultrasonic waves in the order as described in FIGS. 4A to 4C and FIG. 5.

As illustrated in FIG. 5, a predetermined time lag is present between each of the transmission ultrasonic beams W1, W2, W3 . . . emitted from the vibrator groups of the first group 22S and each of the transmission ultrasonic beams W11, W12, W13 . . . emitted from the vibrator groups of the second group 22S. Thus, the same time lag also occurs between each of the reflected ultrasonic waves R1, R2 . . . received by the vibrator groups of the first group 22S and each of the reflected ultrasonic waves R11, R12 . . . received by the vibrator groups of the second group 22S.

Therefore, the same time lag also occurs between each of the reception signals of the vibrator groups of the first group 22S and each of the reception signals of the vibrator groups of the second group 22S, which are output by the elements of the ultrasonic vibrator 22 and input to the selection unit 61.

At the timing shown in FIG. 5, the selection unit 61 sets the switch unit 611 to select the vibrator groups of the first group 22S or the vibrator groups of the second group 22S, receives the reflected ultrasonic waves, and sends the received reception signals to the A/D conversion unit 62.

Therefore, as shown in FIG. 6, the A/D conversion unit 62 continuously receives the reception signals of the vibrator groups of the first group 22S and the reception signals of the vibrator groups of the second group 22S from the selection unit 61, and converts the reception signals from analog signals to digital signals. Further, the A/D conversion unit 62 performs the digital conversion while performing the delay compensation and synthesis based on the distance differences between the elements of the vibrator group 22S.

The signal processing unit 64 continuously processes the reception signals of the vibrator groups of the first group 22S and the reception signals of the vibrator groups of the second group 22S digitally converted by the A/D conversion unit 62.

The A/D conversion unit 62 and the signal processing unit 64 can process, as continuous reception signals, the reception signals of the reflected ultrasonic waves of the transmission ultrasonic beams emitted in parallel in the region including the former half region and the latter half region which is a region to be electronically scanned.

Further, the image generation unit 53 displays, on a display unit without overlapping the same waveform, processing signals of the reception signals of the vibrator groups of the first group 22S and processing signals of the reception signals of the vibrator groups of the second group 22S, which are continuously processed by the signal processing unit 64.

More specifically, the image generation unit 53 displays the processing result of the reception signals, which is obtained by the signal processing unit 64, by shifting a time difference between a time when a vibrator group 22S among the vibrator groups of the first group 22S receives the reflected ultrasonic waves and a time when a vibrator group 22S among the vibrator groups of the second group 22S receives the reflected ultrasonic waves.

Accordingly, when the received ultrasonic wave is compared with a master ultrasonic wave which are normal signals, the two received ultrasonic waves can be compared with each other at the same time. Moreover, comparison at two places can be easily performed.

The invention is not limited to the embodiments described above and includes various modifications. For example, the embodiments described above have been described in detail for easy understanding of the invention, and the invention is not necessarily limited to those including all the configurations described above. A part of a configuration according to one embodiment can be replaced with a configuration according to another embodiment, and the configuration according to another embodiment can be added to the configuration according to one embodiment. In addition, a part of the configuration of each embodiment also could be added, deleted, or replaced with other configurations.

A part or all of the above configurations, functions, processing units, processing methods, or the like may be implemented by hardware such as an integrated circuit. The above configurations, functions, or the like may also be implemented by software by means of interpreting and executing a program, by a processor, for implementing respective functions. Information such as a program, a table, and a file that implements each function can be stored in a recording device such as a memory, a hard disk, or a solid state drive (SSD), or in a recording medium such as a flash memory card or a digital versatile disk (DVD).

In the embodiments, a control line or an information line shows those which are considered necessary for the description, and does not necessarily show all the control line or the information line on a product. It may be considered that almost all the configurations are actually connected to each other.

REFERENCE SIGNS LIST 1 array-type scanning acoustic tomograph
20 array probe
21 encoder
22 ultrasonic vibrator
22S vibrator group
50 image display device
51 scanning control unit
52 control unit
53 image generation unit
60 transceiving device
61 selection unit
611 switch unit
612 vibrator driver
62 A/D conversion unit
64 signal processing unit
65 vibrator signal generation unit
70 mechanical controller
71 X-axis scanner
72 Y-axis scanner
73 Z-axis scanner
90 water tank
91 water
95 subject
95a first layer
95b second layer

The invention claimed is:

1. An array-type scanning acoustic tomograph for sequentially selecting a vibrator group including a predetermined number of continuous elements of an ultrasonic vibrator including a plurality of elements continuously arranged in an array, emitting ultrasonic beams, and receiving, by the vibrator group, reflected ultrasonic waves from a subject, the array-type scanning acoustic tomograph comprising:

a signal processing unit to process reception signals of the reflected ultrasonic waves received by the vibrator group;

a selection unit including multiplexers so as to select the elements constituting the vibrator group that connects vibrator drive signals and the reception signals;

a control unit to divide the vibrator group into a first group that emits ultrasonic beams to a former half of an ultrasonic beam irradiation region and a second group that emits ultrasonic beams to a latter half of the ultrasonic beam irradiation region, and instruct the selection unit to select elements corresponding to the vibrator group of the first group to emit the ultrasonic beams, instruct the selection unit to select elements corresponding to the vibrator group of the second group to emit the ultrasonic beams, then instruct the selection unit to select the elements corresponding to the vibrator group of the first group to receive the reflected ultrasonic waves, and then instruct the selection unit to select the elements corresponding to the vibrator group of the second group to receive the reflected ultrasonic waves; and an image generation unit to display, on a display unit without overlapping the same waveform, a processing result of the reception signals obtained by the signal processing unit;

wherein, for each subsequent selection of elements of the first group, the selection unit selects a different set of elements for each scan of the subject;

wherein, for each subsequent selection of elements of the second group, the selection unit selects a different set of elements for each scan of the subject; and wherein the control unit performs each instruction to the selection unit to select the elements corresponding to the vibrator group of the second group to emit the ultrasonic beams such that a predetermined number of unused elements are disposed between the first group and the second group.

2. The array-type scanning acoustic tomograph according to claim 1, wherein the image generation unit displays the processing result of the reception signals, which is obtained by the signal processing unit, by shifting a time difference between a time when the vibrator group of the first group receives the reflected ultrasonic waves and a time when the vibrator group of the second group receives the reflected ultrasonic waves.

3. The array-type scanning acoustic tomograph according to claim 1, wherein the control unit controls the vibrator group of the first group to emit ultrasonic beams, and then controls the vibrator group of the second group to emit ultrasonic beams, the vibrator group of the second group being located at a position apart from the vibrator group of the first group by a distance at which ultrasonic waves of the vibrator group of the second group do not interfere with that of the vibrator group of the first group.

4. The array-type scanning acoustic tomograph according to claim 3, wherein the control unit controls the vibrator group of the first group to emit ultrasonic beams, then controls the vibrator group of the second group to emit ultrasonic beams, and sequentially selects the vibrator group of the first group and the vibrator group of the second group, respectively, in a way of alternately selecting the vibrator group of the first group and the vibrator group of the second group, the vibrator group of the second group being located at a position apart from the vibrator group of the first group by a distance at which ultrasonic waves of the vibrator group of the second group does not interfere with that of the vibrator group of the first group.

5. The array-type scanning acoustic tomograph according to claim 3, further comprising:

an A/D conversion unit to convert the reception signals of the reflected ultrasonic waves received by the elements of the vibrator group from analog signals to digital signals; and a signal processing unit to process the reception signals of the reflected ultrasonic waves converted into the digital signals by the A/D conversion unit, wherein the reception signals of the reflected ultrasonic waves of the elements corresponding to the vibrator group of the first group selected by the selection unit are digitally converted by the A/D conversion unit, and the digitally converted reception signals are processed by the signal processing unit, and the reception signals of the reflected ultrasonic waves of the elements corresponding to the vibrator group of the second group selected by the selection unit are digitally converted by the A/D conversion unit, and the digitally converted reception signals are processed by the signal processing unit.

6. The array-type scanning acoustic tomograph according to claim 5, wherein the signal processing unit performs imaging processing on the reception signals obtained by digitally converting the reception signals of the reflected ultrasonic waves of the elements corresponding to the vibrator group of the first group or the second group selected by the selection unit, at a gate in which a start timing and an end timing for imaging are set as a time axis which is a horizontal axis, and an allowable maximum amplitude is set as a vertical axis.

7. The array-type scanning acoustic tomograph according to claim 1, wherein for each subsequent selection of elements of the first group, the different set of elements corresponds to a shift of one element from a previously selected set of elements of the first group, and for each subsequent selection of elements of the second group, the different set of elements corresponds to a shift of one element from a previously selected set of elements of the second group.

8. An ultrasonic image display method of an array-type scanning acoustic tomograph for sequentially selecting a vibrator group including a predetermined number of continuous elements of an ultrasonic vibrator including a plurality of elements continuously arranged in an array, emitting ultrasonic beams, and receiving reflected ultrasonic waves from a subject, the ultrasonic image display method comprising:

dividing the vibrator group into a first group that emits ultrasonic beams to a former half of an ultrasonic beam irradiation region and a second group that emits ultrasonic beams to a latter half of the ultrasonic beam irradiation region;

selecting elements corresponding to the vibrator group of the first group by multiplexers to emit the ultrasonic beams, selecting elements corresponding to the vibrator group of the second group by multiplexers to emit the ultrasonic beams, then selecting elements corresponding to the vibrator group of the first group by multiplexers to receive the reflected ultrasonic wave, and then instructing the selection unit to select the elements corresponding to the vibrator group of the second group by multiplexers to receive the reflected ultrasonic wave; and displaying reception signals of the reflected ultrasonic waves of the vibrator group of the first group and reception signals of the reflected ultrasonic waves of the vibrator group of the second group on a display unit without overlapping the same waveform;

wherein, for each subsequent selection of elements of the first group, a different set of elements are selected for each scan of the subject;

wherein, for each subsequent selection of elements of the second group, a different set of elements are selected for each scan of the subject; and wherein each instruction to the selection unit to select the elements corresponding to the vibrator group of the second group to emit the ultrasonic beams is performed such that a predetermined number of unused elements are disposed between the first group and the second group.

9. The ultrasonic image display method according to claim 8, wherein
for each subsequent selection of elements of the first group, the different set of elements corresponds to a shift of one element from a previously selected set of elements of the first group, and
for each subsequent selection of elements of the second group, the different set of elements corresponds to a shift of one element from a previously selected set of elements of the second group.

* * * * *